(12) United States Patent
Setchell

(10) Patent No.: US 11,885,650 B2
(45) Date of Patent: Jan. 30, 2024

(54) MOTION ENCODER

(71) Applicant: IMETRUM LTD., Bristol (GB)

(72) Inventor: Chris Setchell, Bristol (GB)

(73) Assignee: Imetrum Ltd., Bristol (GB)

( * ) Notice: Subject to any disclaimer, the term of this patent is extended or adjusted under 35 U.S.C. 154(b) by 600 days.

(21) Appl. No.: 17/057,179

(22) PCT Filed: May 16, 2019

(86) PCT No.: PCT/GB2019/051338
§ 371 (c)(1),
(2) Date: Nov. 20, 2020

(87) PCT Pub. No.: WO2019/224522
PCT Pub. Date: Nov. 28, 2019

(65) Prior Publication Data
US 2021/0207979 A1  Jul. 8, 2021

(30) Foreign Application Priority Data
May 25, 2018  (GB) .................................... 1808661

(51) Int. Cl.
*G01P 3/38* (2006.01)
*G01D 5/26* (2006.01)
(Continued)

(52) U.S. Cl.
CPC .............. *G01D 5/26* (2013.01); *B25J 13/088* (2013.01); *G01P 3/38* (2013.01); *G06T 7/248* (2017.01); *H04N 23/56* (2023.01)

(58) Field of Classification Search
CPC .... H04N 23/675; H04N 23/69; H04N 23/611; G06F 16/24578; G06T 7/90
See application file for complete search history.

(56) References Cited

U.S. PATENT DOCUMENTS

| 7,085,673 B2 | 8/2006 | Picciotto et al. |
| 2016/0153775 A1 | 6/2016 | Hocquette |
| 2017/0205360 A1 | 7/2017 | Cinquin et al. |

FOREIGN PATENT DOCUMENTS

| CN | 102052903 A | 5/2011 |
| CN | 102121821 A | 7/2011 |

(Continued)

OTHER PUBLICATIONS

Chinese Intellectual Property Office, Chinese Patent Application No. 201980035222.8, Office Action, dated Mar. 23, 2022, pp. 1-11.
(Continued)

*Primary Examiner* — Sam Bhattacharya
(74) *Attorney, Agent, or Firm* — Hunton Andrews Kurth LLP

(57) ABSTRACT

A motion encoder comprising a joint, the joint comprising a first part (304); and a second part (302) movably mounted with respect to the first part (304) to change the joint between a first joint condition and a second joint condition; a first image capture device (ICD) (310) comprising an array of light sensing elements arranged to generate images; a processing unit; and a pattern surface (312), the pattern surface (312) defining or being arranged to define a pattern (314) which moves relative to the first ICD (310) between a first pattern position and a second pattern position as the joint changes between the first joint condition and a second joint condition, the pattern (314) comprising pattern features, wherein the first ICD (310) has a field of view encompassing the first pattern position and the second pattern position such that the pattern features are visible to the first ICD (310) in both the first pattern position and the second pattern position; and the processing unit is communicatively coupled to the first ICD (310) to receive the images from the first ICD (310), the processing unit being configured to determine how image features corresponding (Continued)

to the pattern features transform between the received images to quantify the position and/or movement of the first part (304) relative to the first ICD (310).

24 Claims, 9 Drawing Sheets

(51) Int. Cl.
*G06T 7/246* (2017.01)
*B25J 13/08* (2006.01)
*H04N 23/56* (2023.01)

(56) References Cited

FOREIGN PATENT DOCUMENTS

| | | |
|---|---|---|
| CN | 102322802 A | 1/2012 |
| CN | 102831617 A | 12/2012 |
| CN | 103630116 A | 3/2014 |
| CN | 103649676 A | 3/2014 |
| CN | 105701802 A | 6/2016 |
| CN | 106296643 A | 1/2017 |
| DE | 2430058 A1 | 1/1976 |
| DE | 3241510 A1 | 5/1984 |
| EP | 0114505 A1 | 8/1984 |
| JP | H4148814 A | 5/1992 |
| JP | H1151651 A | 2/1999 |
| JP | 2005537583 A | 12/2005 |
| WO | 0138823 A1 | 5/2001 |
| WO | 2001038823 A1 | 5/2001 |
| WO | 2010089139 A1 | 8/2010 |
| WO | 2015132981 A1 | 9/2015 |
| WO | 2018027206 A1 | 2/2018 |

OTHER PUBLICATIONS

Japanese Intellectual Property Office, Japanese Patent Application No. 2021-515287, Notice of Reasons for Rejection, dated Oct. 25, 2022, pp. 1-4 (Japanese Document and English Translation).

European Patent Office, European Patent Application No. 19726088.8, Communication Pursuant to Article 94(3) EPC, dated Apr. 25, 2023, pp. 1-4.

Intellectual Property Office of India, Examination Report Under Sections 12 & 13 of the Patents Act, 1970 and the Patent Rules, 2003, Indian Application No. 202017050074, dated Sep. 21, 2022, pp. 1-7.

International Searching Authority, PCT International Search Report and Written Opinion, International Application No. PCT/GB2019/051338, dated Sep. 20, 2019, pp. 1-21.

UK Intellectual Property Office, Application No. GB 1808661.1, Combined Search and Examination Report Under Sections 17 & 18(3), dated Dec. 19, 2018, pp.

UK Intellectual Property Office, Application No. GB1808661.1, Examination Report Under Section 18(3), dated Dec. 6, 2019, pp. 1-3.

MOTION ENCODER

BACKGROUND

Motion encoders are commonly used to accurately measure the movement of different mechanical parts of a joint that can be found in many industrial devices (e.g. manufacturing devices, assembly robots or surveying equipment). These sensors measure the movement of the mechanical parts and quantify rotational or linear movement of one part in relation to another.

A motion encoder can employ an optical sensor, which usually comprise a read-head and a scale, with the scale encoding precise geometric information e.g. distance or angle. As the read-head moves relative to the scale the sensor infers the movement of the joint.

The present inventor has identified that known motion encoders can suffer from one or more of the following limitations:
- They can typically measure movement or rotation in one direction only, i.e. along or about only one axis, requiring installation of multiple sensors to track movement with multiple degrees of freedom.
- Their accuracy can depend on the accuracy of a scale, necessitating a precise and complex manufacturing process in order to produce a sufficiently accurate scale.
- If a scale becomes misaligned it can affect the accuracy and reliability of measurements. A scale can become misaligned during manufacture and also in use due to unintended compliance in a bearing for example.

SUMMARY

In accordance with a first aspect of the present invention, there is provided a motion encoder according to claim 1. The motion encoder is an apparatus.

Thus, the motion encoder according to the first aspect determines movement of the first part of the joint by measuring movement of pattern features between images. In contrast to known optical motion encoders, the encoder according to the first aspect does not require a precise, known scale to infer the movement of the joint, which can lead to a simpler motion encoder of reduced cost.

A motion encoder according to the first aspect can also measure joint movement about and/or along multiple axes with a single ICD.

A motion encoder according to the first aspect can also have improved accuracy and/or reliability in comparison to known motion encoders as it is tolerant to movement in the joint, for example from bearing compliance, bearing runout, and/or wear of the joint, as well as being tolerant to dirt, dust and other such contaminants.

A motion encoder according to the first aspect can also be less susceptible to cross-talk in comparison to known encoders, i.e. movement about/along one axis has reduced impact on measurement about/along another axis.

Moreover, for rotation measurement, accuracy and resolution is not dependent on the diameter of a circular scale, i.e. a large scale is not required in order to obtain high levels of accuracy and/or resolution.

The motion encoder can further comprise an auxiliary pattern surface defining or being arranged to define an auxiliary pattern, the auxiliary pattern comprising auxiliary pattern features.

The pattern surface can physically define the pattern features and the auxiliary pattern surface can physically define the auxiliary pattern features.

The processing unit can be configured to determine how image features corresponding to the pattern features transform between the received images by determining displacement, such as circularly or elliptically rotational displacement, of the image features between the received images to quantify rotational movement of the first part relative to the first ICD about an axis, such as a central axis of the first part.

The processing unit can be configured to process computer program code which, when executed, uses template matching techniques coupled with a motion model to measure the position and motion of features in the images received from the ICD.

The processing unit can comprise one or more processors, one or more non-transitory computer readable medium that can store data, such as read-only memory or random-access memory, interfaces to communicatively couple the computer readable medium with the one or more processors and the ICD and a user input device that allows a user to interact with the processing unit.

The auxiliary pattern surface can be arranged in a spatially fixed relationship, such as an axially offset and parallel relationship, with respect to the pattern surface and the processing unit can be configured to determine a first datum point for the pattern in an image and determine a corresponding second datum point for the auxiliary pattern in the image and establish an orientation of an axis for linking the pattern surface and the auxiliary pattern surface.

The processing unit can be configured to determine how image features corresponding to the pattern features transform between the received images by determining linear displacement of the image features between the received images, for example along two orthogonal axis, to quantify lateral movement of the first part relative to the first ICD, for example along a pair of axes which are orthogonal to the central axis of the first part.

The pattern features can be circularly symmetrical, such as a plurality of features with equiangular spacing around a circular path.

The pattern surface can comprise a reflective surface arranged to reflect the pattern features, the pattern features being defined by a remote object with respect to the pattern surface. Optionally, when dependent on claim 2, the auxiliary pattern surface comprises an auxiliary reflective surface arranged to reflect the auxiliary pattern features, the auxiliary pattern features being defined by a remote object with respect to the auxiliary pattern surface, wherein either the auxiliary pattern surface is arranged in a spatially fixed, axially offset and parallel relationship with respect to the pattern surface or the auxiliary reflective surface is arranged in a spatially fixed, axially offset and parallel relationship with respect to the reflective surface. The first and second reflective surfaces can have the same or different levels of reflection.

The pattern features can be defined by being projected onto the reflective surface by a first light source and optionally the auxiliary pattern features are defined by being projected onto the auxiliary reflective surface by a second light source, which can be the first light source. The remote object can comprise an optical mask and the light source can be positioned to backlight the optical mask with respect to the reflective surface.

The first light source can be arranged to project the pattern features along a fixed projection axis the orientation of which is known and is offset and/or non-parallel with respect to the optical axis of the first ICD, the processing unit being configured to determine how image features corresponding to the pattern features transform between the received images by determining linear displacement of the image along an axis to quantify axial movement of the first part relative to the first ICD along the central axis of the first part.

The first ICD can be arranged to view the pattern surface, and optionally the auxiliary pattern surface, through a hole in the remote object.

The pattern features can comprise a first subset and a second subset different than the first subset. The processing unit can be configured to determine how image features corresponding to the pattern features transform between the received images by determining a change in the distance between first subset and the second subset to quantify axial movement of the first part relative to the first ICD, for example along the central axis of the first part.

The motion encoder can further comprise a collimating lens arranged so that the pattern features and the first ICD are at the focal point of the collimating lens. Thus, a collimated image of the features is projected towards and reflected from the reflective surface.

The motion encoder can further comprise a beam splitter arranged to receive light from the light source and direct it towards the reflective surface and permit an image of the features to pass through the beam splitter to be observed by the first ICD.

The processing unit can be configured to determine how image features corresponding to the pattern features transform between the received images by determining displacement of the image features between the received images to quantify rotational movement of the first part relative to the first ICD about orthogonal lateral axes of the first part.

The motion encoder can further comprise one or more first fiducial markers located in a known spatial relationship with respect to a joint coordinate system and wherein the processing unit is configured to determine how image features corresponding to the pattern features transform between the received images to quantify the position and/or movement of the first part relative to the joint coordinate system. A plurality of first fiducial markers can be provided to define an orientation of a joint coordinate system.

The motion encoder can further comprise one or more second fiducial markers arranged to define at least some of the pattern features or indicate a region of the first part at which pattern features should be selected.

The motion encoder can further comprise one or more further sensors arranged to measure movement of the first part relative to the second part, wherein the processing unit is configured to quantify the position and/or movement of the first part relative to the first ICD based on how image features transform between the received images and the outputs of the one or more further sensors. The one or more further sensors can be non-vision based encoders, scaled based motion encoders or the like, or motion encoders according to embodiments of the invention, for example.

The first ICD can be mounted in a known spatial relationship with respect to the second part and the processing unit can be configured to quantify the movement of the first part relative to the second part based on the quantified movement of the first part relative to the ICD and the known spatial relationship between the second part and the ICD.

The motion encoder can further comprise a second ICD mounted in a known spatial relationship with respect to the first ICD, a second ICD comprising an array of light sensing elements arranged to generate images, and having a second field of view encompassing the first and second pattern positions such that the pattern features are visible to the second ICD in both the first pattern position and the second pattern position. The processing unit can be coupled to the first ICD and the second ICD and be configured to determine how image features corresponding to the pattern features transform between the received images from both ICDs to quantify the position and/or movement of the first part relative to the first ICD.

The second part can be movably mounted with respect to the first part to change the joint to a third joint condition and the pattern moves relative to the first ICD to a third pattern position as the joint changes between the first and/or second joint condition and the third joint condition, the third pattern position being at least partially outside the field of view of the first ICD, wherein the processing unit is configured to: determine that the pattern is moving to the third pattern position; select new image features having a known spatial relationship with respect to the image pattern features to replace the image pattern features; and determine how the new image features transform between the received images to quantify the position and/or movement of the first part relative to the first ICD.

The processing unit can be configured to determine how image features corresponding to the pattern features transform between the received images by determining displacement of the image features between the received images to quantify axial movement of the first part relative to the first ICD, such as along a central axis of the first part.

According to a second aspect of the invention there is provided a method of measuring movement of a first part of a joint, the joint comprising: a first part; and a second part, the first part being movably mounted with respect to the second part to change the joint between a first joint condition and a second joint condition; the method comprising receiving by the processing unit a first image generated by a first image capture device (ICD) comprising an array of light sensing elements arranged to generate images; the first image including at least some of a pattern surface, the pattern surface defining or being arranged to define a pattern which moves relative to the first ICD between a first pattern position and a second pattern position as the joint changes between the first joint condition and a second joint condition, the pattern comprising pattern features; receiving at the processing unit a second image from the first ICD; and determining how image features corresponding to the pattern features transform between the received images to quantify the position and/or movement of the first part relative to the first ICD.

Optional features of the first aspect can be applied to the method of the second aspect in an analogous manner.

According to a third aspect of the invention there is provided a subassembly for a motion encoder according to the first aspect, the subassembly comprising: a first image capture device (ICD) comprising an array of light sensing elements arranged to generate images; and a processing unit, the processing unit being communicatively coupled to the first ICD to receive the images from the first ICD, the processing unit being configured to determine how image features corresponding to the pattern features transform between the received images to quantify the position and/or movement of the first part relative to the first ICD.

Some or all of the features of the subassembly can be contained within a common housing.

BRIEF DESCRIPTION OF THE DRAWINGS

By way of example only, certain embodiments of the invention will now be described by reference to the accompanying drawings, in which.

DETAILED DESCRIPTION

By way of a non-limiting overview, embodiments of the invention relate to a vision-based joint encoder which measures how features change between images in a sequence of images to determine how a part of a joint moves relative to another part.

Figure 1:
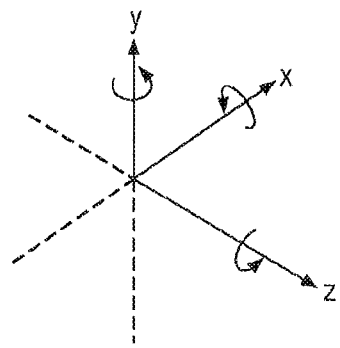
FIG. 1 is a diagram illustrating six degrees of joint freedom.

Referring to FIG. 1, a diagram presenting the six different ways a body can move in a three-dimensional space is shown. A coordinate system with three axes X, Y and Z is established, and the movement of the body in this three-dimensional space can be quantified by six independent parameters. Three of those parameters quantify axial movement along the different axes X, Y and Z, while a further three parameters quantify rotational movement about the different axes X, Y and Z. The six independent parameters are known as six Degrees of Freedom (DoF). Axis Z can be generally thought to be the longitudinal axis of the joint, although this is not necessarily the case.

It is common in robotic or similar mechanical application to have a first part that moves relative to a second part, through the use of a joint. The joint can enable movement of the first part relative to the second part in all six DoF or constrain movement in certain ways, thus resulting in fewer DoF. For example, when a joint is configured to enable a first part to only rotate about the X axis, the movement has only one DoF. If it can both rotate about and move along the X axis the movement has two DoF, etc.

Figure 2:
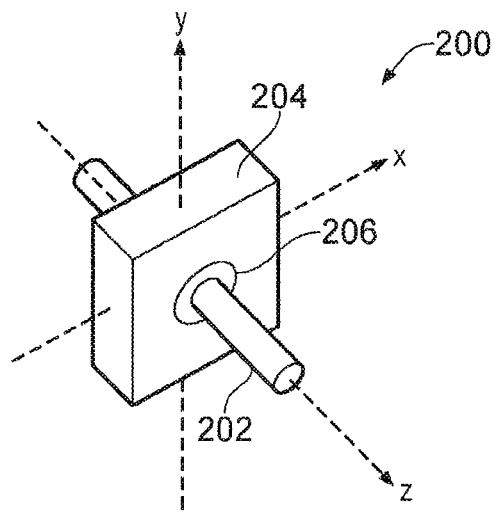
FIG. 2 is a diagram of a joint.

In FIG. 2, a joint is shown generally at 200. A first part 202, which in this example is a shaft, is coupled to a second part 204, which in this example is a housing, through a bearing 206.

The bearing 206 is configured to only allow rotation of the shaft about the longitudinal axis of the shaft, which is generally parallel to the Z axis. Thus, in this case the joint restricts the movement of the first part 202 to one DoF.

Figure 3A:
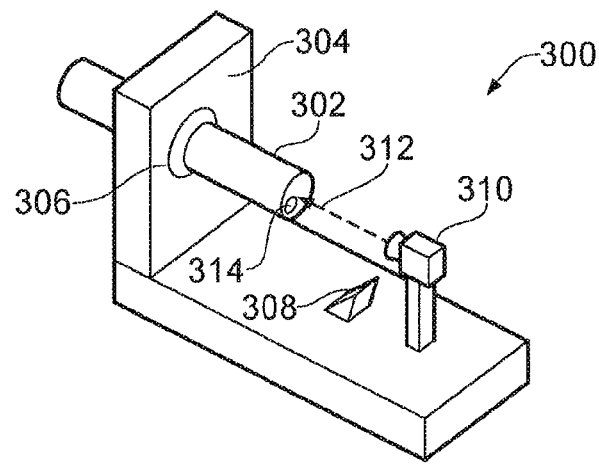
FIG. 3A is a diagram of a motion encoder according to a first embodiment of the invention.

Referring to FIG. 3a, a diagram of a motion encoder according to an embodiment of the invention is shown generally at 300. Although the axes are not depicted, they may be defined as depicted in FIG. 2.

The motion encoder includes a first part 302 coupled through a bearing 306 to a second part 304, a first ICD 310, a pattern surface 312, an optional source of illumination 308 and a processing unit, which in this embodiment is incorporated into the first ICD 310.

In this embodiment the first part 302 is a shaft and the second part 304 is a mounting plate or housing. As the first part 302 rotates about its longitudinal axis Z, the joint transitions or changes from a first joint condition to a second joint condition.

The pattern surface 312 is positioned on the first part 302 of the joint, on a flat axial surface facing the ICD 310, and defines a set of pattern features. The pattern features define a pattern 314. In this embodiment the pattern features are light and dark markings on the axial surface, although in other embodiments the pattern features can be physically defined in other manners such as by way of protrusions and recesses of the axial surface.

The ICD 310 is positioned on the second part 304 of the joint so as to have a fixed spatial relationship with respect to it and arranged such that its optical axis is approximately parallel to the nominal axis of rotation of the first part 302.

Rotation of the first part 302 will result in any point on the pattern 314 following a generally circular path. The corresponding feature in the image i.e. the image feature will move according to the projection of that circular path onto the light sensing elements of the ICD 310.

Figure 3B:
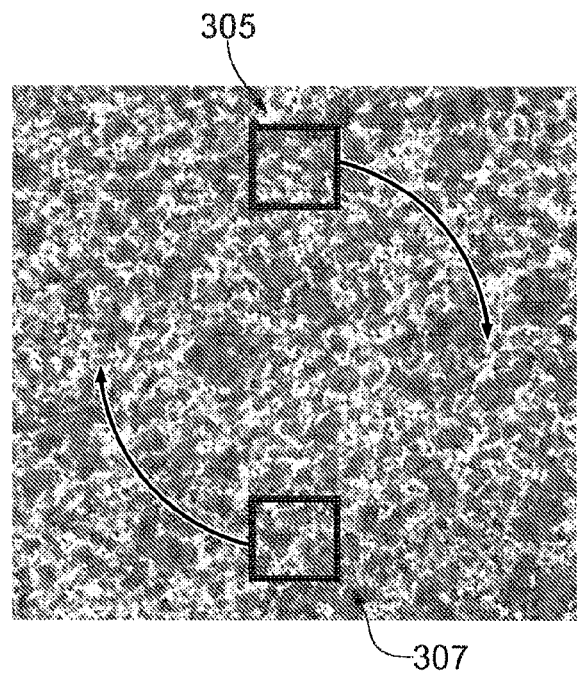
FIG. 3B is a diagram illustrating motion of image features observed by the ICD of the motion encoder of FIG. 3A.

In FIG. 3B an example of the movement of a pattern 314 for the embodiment of FIG. 3a is shown. In this embodiment the image features comprise two groups 305, 307, but in other embodiments more groups of features may be selected, or just a single group.

In this embodiment the motion of the features resulting from the rotation of the first part 302 is generally circular. However, if the optical axis of the ICD 310 is not aligned with the rotational axis of the first part 302 then it may be generally elliptical.

The source of illumination 308, which in this embodiment is a LED lamp, is arranged to illuminate the surface pattern features such that they are discernible by the ICD 310.

The processing unit employs template matching techniques and a mathematical model of the circular motion of the pattern and the projection of that motion onto the image plane of the ICD 310 to calculate an angle of rotation (rotation around the longitudinal axis of the first part) and a centre of rotation (in two-dimensional plane perpendicular to the longitudinal axis of the first part).

Thus, the processing unit can measure rotational movement of the first part 302 relative to the ICD 310 about axis Z. As the position of the ICD is known relative to the second part 304, the processing unit can measure rotational movement of the first part 302 relative to the second part 304.

An advantage of the motion encoder of FIG. 3A is that it does not require a predefined scale to measure movement as the pattern can be selected prior, during or after the first part moves relative to the ICD. Thus, the measurement relies not on identifying the precise position of a point on a scale, but on identifying how a set of points transforms over time.

Figure 4:
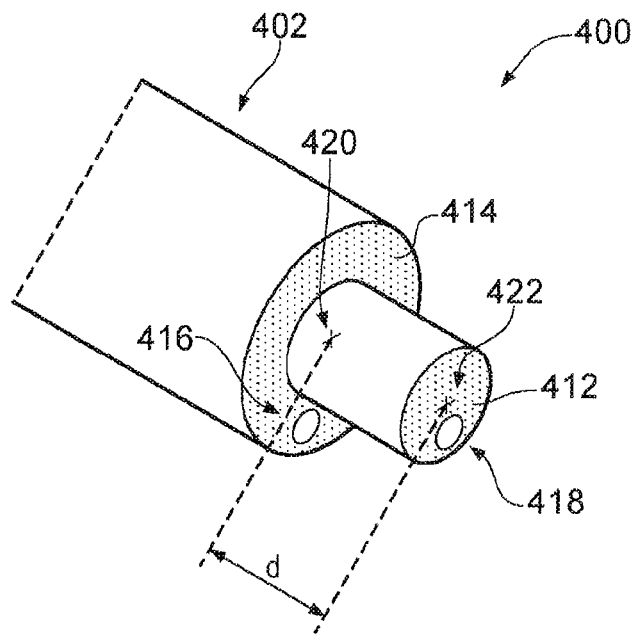
FIG. 4 is a diagram of a motion encoder according to a further embodiment of the invention.

Referring now to FIG. 4, a motion encoder according to a further embodiment is shown generally at 400. The motion encoder 400 is similar to the motion encoder 300 of FIG. 3a and for brevity the following description will focus on the differences.

In this embodiment, the flat surface of the cylindrical first part 402 facing the ICD (not shown) comprises an inner and extended primary surface 412, which is axially offset and parallel to an annular auxiliary surface 414. The axial offset, or in other words the distance D between the primary surface 412 and the auxiliary surface 414, is known to the processing unit.

Features of the auxiliary surface 414 comprise an auxiliary pattern 416. Features of the primary surface 412 comprise a primary pattern 418.

As the first part 402 rotates about its longitudinal axis the ICD captures a sequence of images, each of which includes features of the primary surface 412 and the auxiliary surface 414.

The processing unit determines a first centre of rotation 422 i.e. a first datum point based on the observed movement of the primary pattern 418 as the first part 402 rotates. The processing unit defines a second centre of rotation 420 i.e. a second datum point based on the observed movement of the auxiliary pattern 416 as the first part 402 rotates. The processing unit then determines the axis of rotation based on the first centre of rotation 422, the second centre of rotation 420 and the distance D, in relation to axes X, Y and Z.

Although only two parallel surfaces are shown in this embodiment, the pattern surface can comprise more, at known axially offsets from each other.

An advantage of the embodiment of FIG. 4 is that it enables the motion encoder to quantify the orientation of the axis of rotation.

Figure 5A:
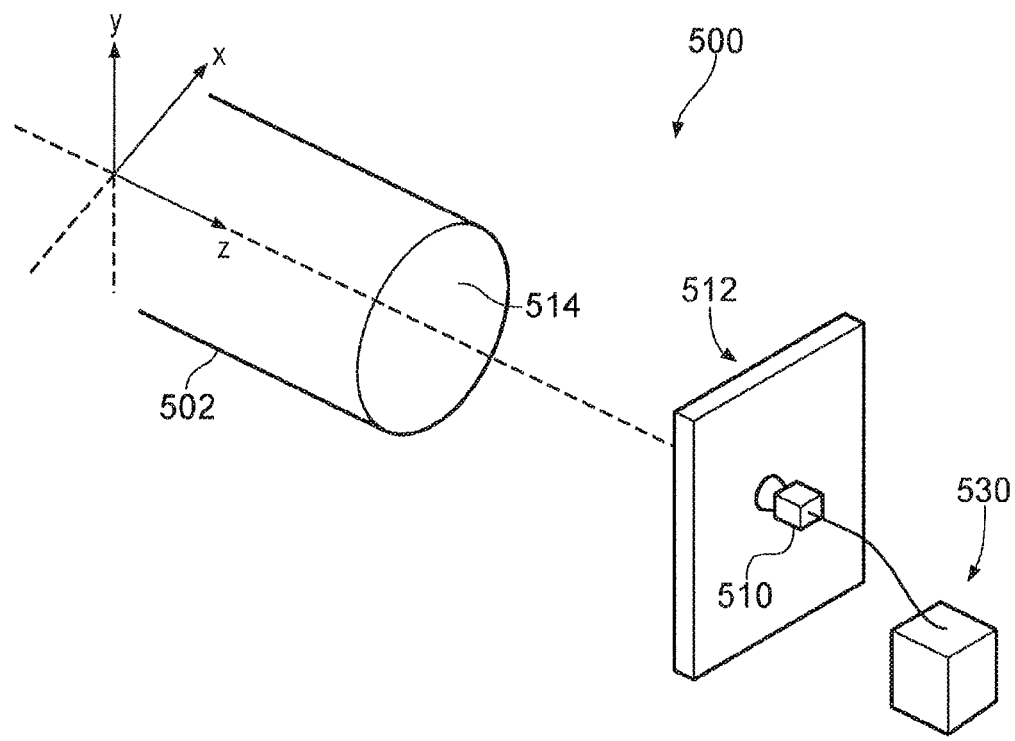
FIG. 5A is a diagram of a motion encoder according to a further embodiment of the invention.

Referring now to FIG. 5a, a diagram of a motion encoder according to a further embodiment of the invention is shown generally at 500. The motion encoder of FIG. 5a is able to measure rotation with two DoF and comprises a first part 502 movably mounted with respect to a second part (not shown), a pattern surface 512, a reflective surface 514 and an ICD 510.

The reflective surface 514 is located on the flat axial surface of the first part 502 facing the ICD 510 and is configured to be partially or totally reflective, such that it reflects the pattern surface 512, e.g. a remote object configured to define pattern features, towards the ICD 510.

The processing unit 530 is communicatively coupled to the ICD 510 and comprises one or more processors, at least one non-transitory computer readable medium arranged to store computer program data which can be executed by the processors, and interfaces to communicatively couple the computer readable medium with the one or more processors and the ICD. Although in FIG. 5A the processing unit 530 is coupled through a wire to the ICD 510, in other embodiments the processing unit 530 can be connected to the ICD in a wireless fashion. Furthermore, although not shown in FIG. 5a the processing unit may comprise or be communicatively coupled to a user input device that allows a user to interact with the processing unit 530 to provide control inputs.

The ICD 510 is positioned in the far side of the pattern surface 512 relative to the first part 502 with its optical axis generally aligned with the rotational axis of the first part 502. The ICD 510 is configured to image the reflective surface 514 through an aperture (not shown) of the pattern surface 512.

The pattern surface in this embodiment is illuminated by an external light source (not shown) in a manner that enables its features to be reflected by the reflective surface 514 towards the ICD 510 and thus be discernible by the ICD 510.

Figure 5B:
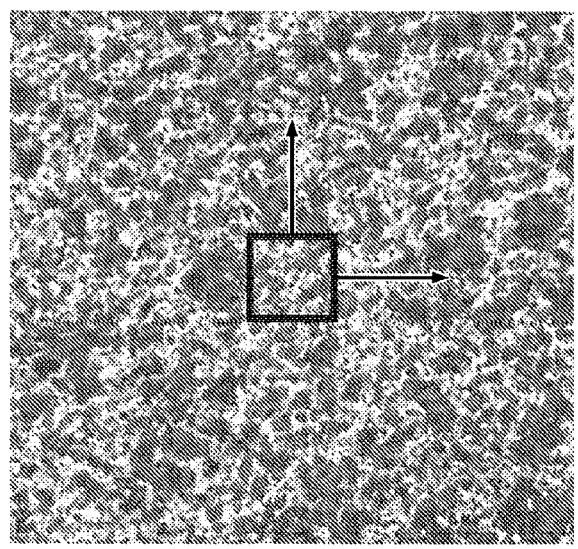
FIG. 5B is a diagram illustrating motion of image features observed by the ICD of the motion encoder of FIG. 5A.

Observing now the X, Y and Z axes of FIG. 5A, as the first part 502 rotates about the X or the Y axis, this results in a generally linear movement of the reflected pattern as depicted in FIG. 5B. Rotation of the first part 502 about the Y axis results in the reflected features comprising the pattern to move horizontally, while rotation of the first part about the X axis results in the reflected features comprising the pattern to move vertically.

The processing unit determines the rotation about the X axis based on the vertical movement of the reflected pattern and the rotation about the Y axis based on the horizontal movement of the reflected pattern.

Thus, the processing unit can measure rotational movement of the first part 502 relative to the ICD 510 about axes X and Y. If the position of the ICD is known relative to the second part, such as when being spatially fixed, then the processing unit can measure rotational movement of the first part 502 relative to the second part.

An advantage of the embodiment illustrated in FIG. 5A is that it translates rotational movement in the joint to lateral movement of the pattern, thus allowing very precise measurements with increased reliability and reduced need of reconfiguration over time. Furthermore, the embodiment of FIG. 5A is able to quantify movement with two DoF with a single ICD.

In an alternate embodiment of this motion encoder, the bearing enables the first part 502 to move with one DoF along the Z axis.

Figure 8A:
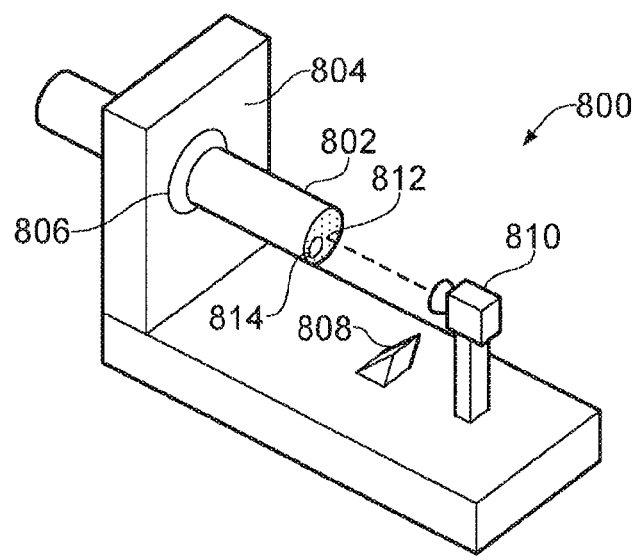
FIG. 8A is a diagram of a motion encoder according to a further embodiment of the invention.
Figure 8B:
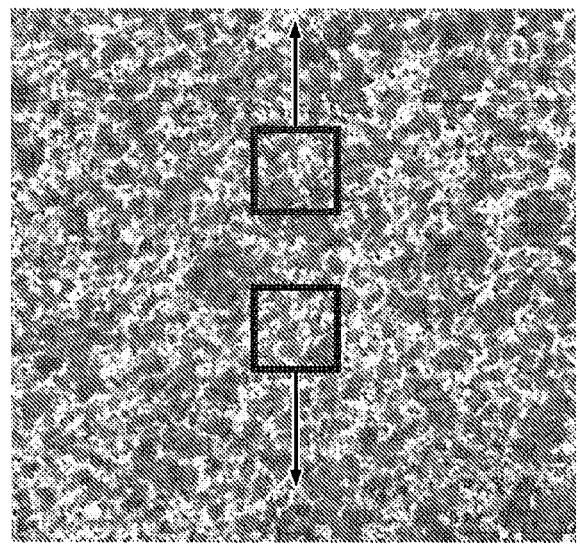
FIG. 8B is a diagram illustrating motion of image features observed by the ICD of the motion encoder of FIG. 8A.

Movement of the first part 502 along the Z axis will result in the features of the reflected pattern of the pattern surface 512 moving further apart from each other as the first part 502 moves closer to the ICD 510 or closer together as the first part 502 moves away from the ICD 510, as depicted in FIG. 8B.

An advantage of such a motion encoder is that the motion of the features in the image will be essentially independent of rotation of the first part about the Z axis.

Figure 6:
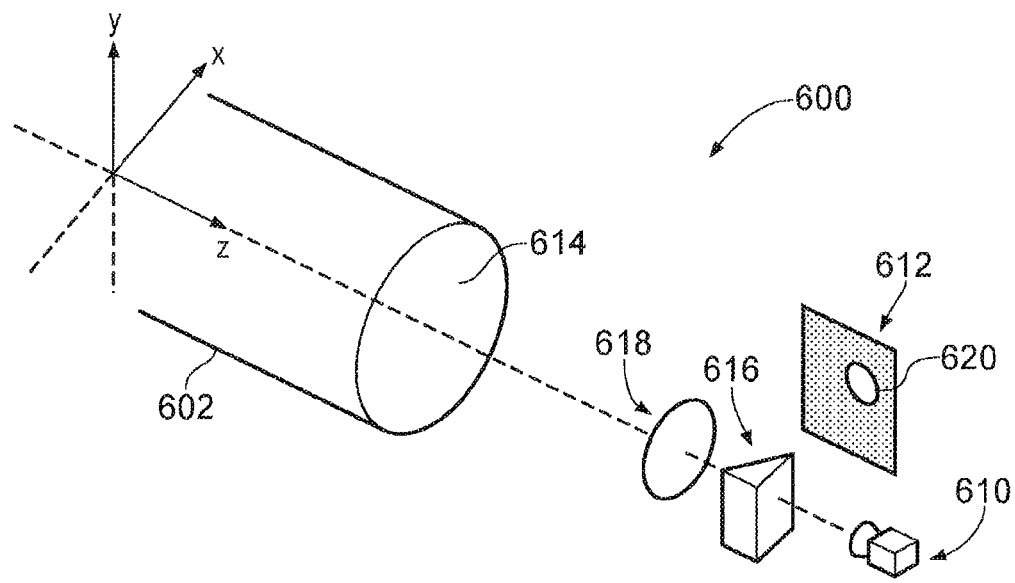
FIG. 6 is a diagram of a motion encoder according to a further embodiment of the invention.

Referring now to FIG. 6 a diagram of a motion encoder according to a further embodiment of the invention is shown generally at 600. The motion encoder of FIG. 6 functions in a similar manner as the embodiment of FIG. 5A. Further to the elements of the embodiment of FIG. 5A, the embodiment of FIG. 6 includes a beam splitter 616 and a collimating lens 618.

The ICD 610 is positioned on the far side of the beam splitter 616 relative to the first part 602.

The beam splitter 616 is arranged to receive light emitted or reflected by the pattern surface 612 and direct it towards the reflective surface 614. The reflection of the pattern 620 then passes through the beam splitter 616 and is observed by the first ICD 610.

The ICD 610, pattern surface 612, collimating lens 618 and beam splitter 616 are positioned such that both the pattern 620 and the ICD 610 are at the focal point of the collimating lens 618. Therefore the ICD 610, lens 618 & beam splitter 616 function as an auto-collimator.

Thus, a collimated image of the features of the pattern 620 is projected towards and reflected from the reflective surface 614. This ensures that any movement of the first part 602 along the Z axis will not affect the imaged features of the pattern 620.

Observing now the X, Y and Z axes of FIG. 6, as the first part 602 rotates about the X or the Y axis, this results to a generally linear movement of the pattern 620 similar to the one depicted in FIG. 5B. Rotation of the first part 602 about the Y axis results in the reflected features comprising the pattern 620 to move horizontally, while rotation of the first part 602 about the X axis may result in the reflected features comprising the pattern 620 to move vertically.

Thus, the processing unit can measure rotational movement of the first part 602 relative to the ICD 610 about axes X and Y. If the position of the ICD is known relative to the second part, such as being spatially fixed, then the processing unit can measure rotational movement of the first part 602 relative to the second part 604.

A further advantage of the embodiment of FIG. 6 is that it enables a more compact arrangement of the encoder elements, as neither the features of the pattern 620 nor the ICD 610 need to be positioned in the same axis. Thus more complex arrangements can be implemented. Moreover, a further advantage of the embodiment of FIG. 6 is that any movement along the Z-axis does not affect the movement of the pattern, thereby reducing cross-talk between measurements.

Figure 7A:
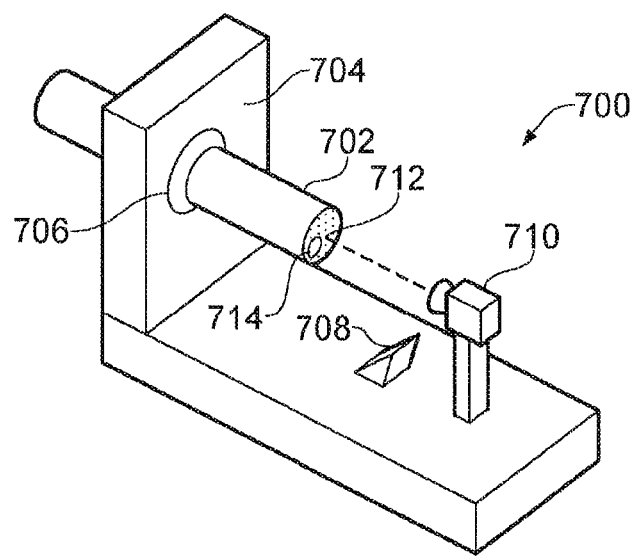
FIG. 7A is a diagram of a motion encoder according to a further embodiment of the invention.

Referring now to FIG. 7A, a diagram of a motion encoder according to a further embodiment of the invention is shown generally at 700. Although the axes are not depicted, they may be defined as depicted in FIG. 2.

The motion encoder includes a first part 702 that in this embodiment is a shaft, coupled through a bearing 706 to a second part 704, a first ICD 710, a pattern surface 712, an optional source of illumination 708, and a processing unit, which in this embodiment is incorporated into the first ICD 710. The bearing 706 allows the first part to only move axially along the X and Y axis. The joint therefore has two DoF.

The pattern surface 712 is positioned on the first part 702 of the joint, on the flat surface facing the ICD 710, and defines a set of pattern features. The pattern features define a pattern 714.

The ICD is positioned on the second part 704 of the joint, and arranged such that its optical axis is approximately parallel to the Z axis.

Figure 7B:
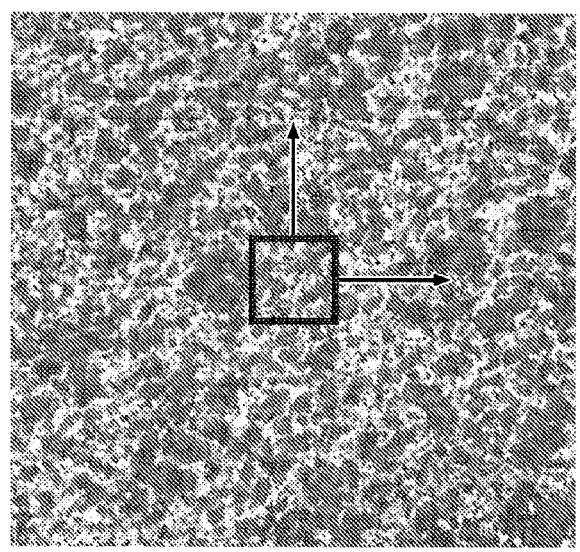
FIG. 7B is a diagram illustrating motion of image features observed by the ICD of the motion encoder of FIG. 7A.

Movement of the first part 702 along the X axis will result in the pattern 714 moving horizontally in the images captured by the ICD while movement of the first part along the Y axis will result in the pattern 714 moving vertically in the images captured by the ICD, as depicted in FIG. 7B.

The processing unit quantifies the movement of the first part along the X and Y axes relative to the ICD 710 based on the vertical and horizontal movement of the pattern in the images captured by the ICD.

An advantage of the embodiment of FIG. 7A is that it can measure movement with multiple DOF with a single optical sensor.

Referring now to FIG. 8A, a diagram of a motion encoder according to an embodiment of the invention is shown generally at 800. Although the axes are not depicted, they may be defined as depicted in FIG. 2.

The motion encoder includes a first part 802 that in this embodiment is a shaft, coupled through a bearing 806 to a second part 804, a first ICD 810, a pattern surface 812, an optional source of illumination 808, and a processing unit, which in this embodiment is incorporated into the first ICD 810. The bearing 806 allows the first part to only move axially along the Z axis. The joint therefore has one DoF.

The pattern surface 812 is positioned on the first part 802 of the joint, on the flat surface facing the ICD 810, and defines a set of pattern features. The pattern features define a pattern 814.

The ICD 810 is positioned on the second part 804 of the joint, and arranged such that its optical axis is approximately parallel to the Z axis.

Movement of the first part 802 along the Z axis will result in the features of the pattern 814 moving further apart from each other as the first part 802 moves closer to the ICD 810 or closer together as the first part 802 moves away from the ICD 810, as depicted in FIG. 8B.

The processing unit can quantify the displacement of the first part 802 along the Z axis by measuring the change in distance between features that constitute pattern 814. This can be accomplished with a variety of mathematical models. As an example, if the relative change in distance between a pair of image features as the first part 802 moves along the Z axis is E, and the initial distance of the pattern surface 812 from the location of the pinhole of the ICD is D then, assuming a pinhole camera model, the displacement of the first part 802 along the Z axis is given by $D \times (1-1/E)$.

Figure 9:
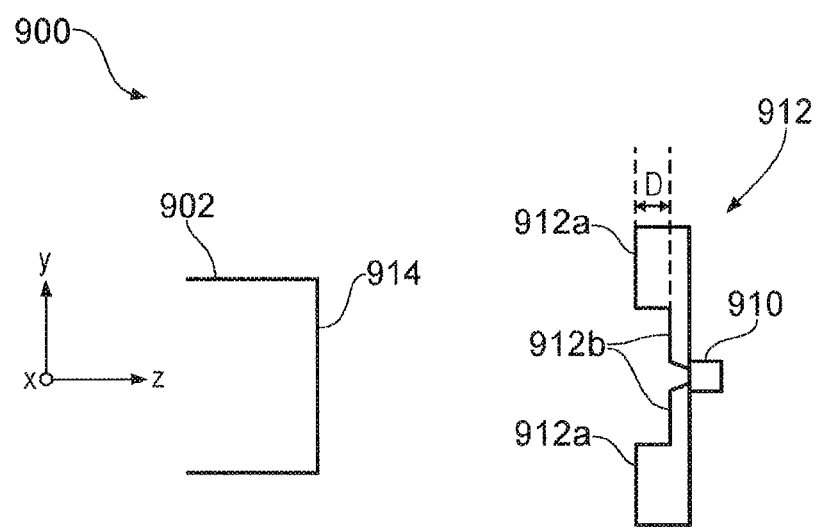
FIG. 9 is a diagram of a motion encoder according to a further embodiment of the invention.

Referring now to FIG. 9, a diagram of a motion encoder according to an embodiment of the invention is shown generally at 900. The motion encoder includes a first part 902, with a reflective surface 914, a first ICD 910, and a pattern surface 912. The joint (not shown) enables the first part 902 to move only along its longitudinal axis, which is generally parallel to the Z axis. The joint therefore has one DoF.

The pattern surface 912 is defined by a remote object with respect to the first part 902 and comprises an outer and extended primary surface 912a, which is axially offset and parallel to an inner auxiliary surface 912b. The axial offset, or in other words the distance D between the plane of the primary surface 912a and the plane of the auxiliary surface 912b, is known to the processing unit. The remote object has a fixed spatial relationship with respect to the ICD 910.

Movement of the first part 902 along the Z axis will result in the features of the pattern 912a moving further apart from each other by a factor E1 as the first part 902 moves closer to the ICD 910. Movement of the first part 902 along the Z axis will also result in the features of the pattern 912b moving further apart from each other by a factor E2 as the first part 902 moves closer to the ICD 910.

The processing unit can determine the displacement of the first part 902 along the Z axis based on a mathematical model that relates displacement of the joint along the Z axis to ratios E1 and E2 based on the equation $e = D \times (E1-1) \times (1-E2)/(E2-E1)$.

Figure 10:
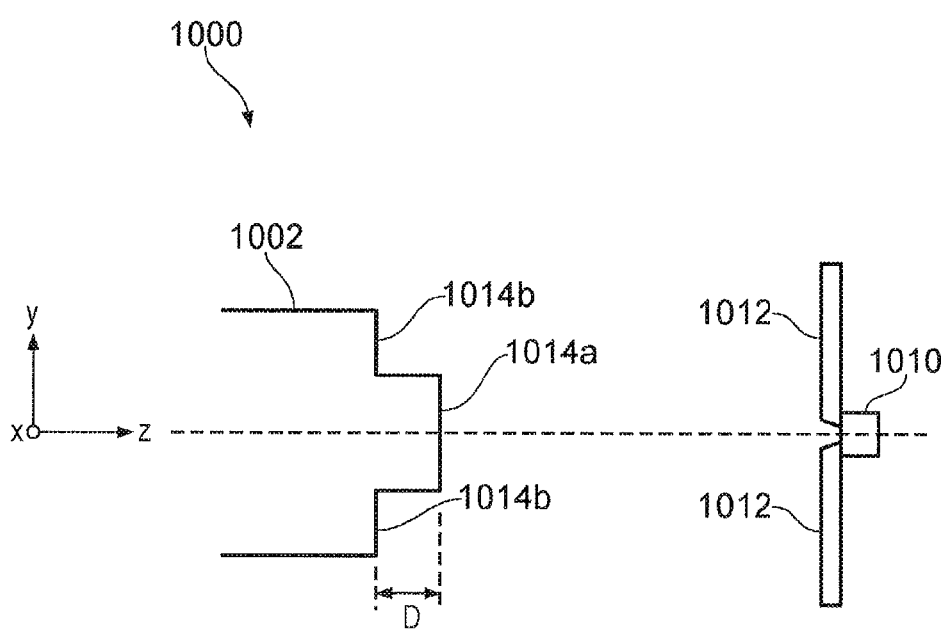
FIG. 10 is a diagram of a motion encoder according to a further embodiment of the invention.

Referring now to FIG. 10, a diagram of a motion encoder according to an embodiment of the invention is shown generally at 1000. The motion encoder includes a first part 1002, with a reflective surface 1014, a first ICD 1010, and a pattern surface 1012. The joint (not shown) enables the first part 1002 to move only along its longitudinal axis, which is generally parallel to the Z axis. The joint has one DoF.

The reflective surface 1014 comprises an inner and extended primary reflective surface 1014a, which is axially offset and parallel to an outer auxiliary surface 1014b. The axial offset, or in other words the distance D between the plane of the primary reflective surface 1014a and the plane of the auxiliary reflective surface 1014b, is known to the processing unit.

Movement of the first part 1002 along the Z axis will result in the features of the pattern reflected by the primary reflective surface 1014a to move further apart from each other by a factor E1 as the first part 1002 moves closer to the ICD 1010.

Movement of the first part 1002 along the Z axis will result in the features of the pattern reflected by the auxiliary reflective surface 1014b to move further apart from each other by a factor E2 as the first part 1002 moves closer to the ICD 1010.

The processing user can determine the displacement of the first part 1002 along the Z axis based on a mathematical model that relates displacement of the joint along the Z axis to ratios E1 and E2 based on the equation $e=D\times(E1-1)\times(1-E2)/(E2-E1)$.

Figure 11:
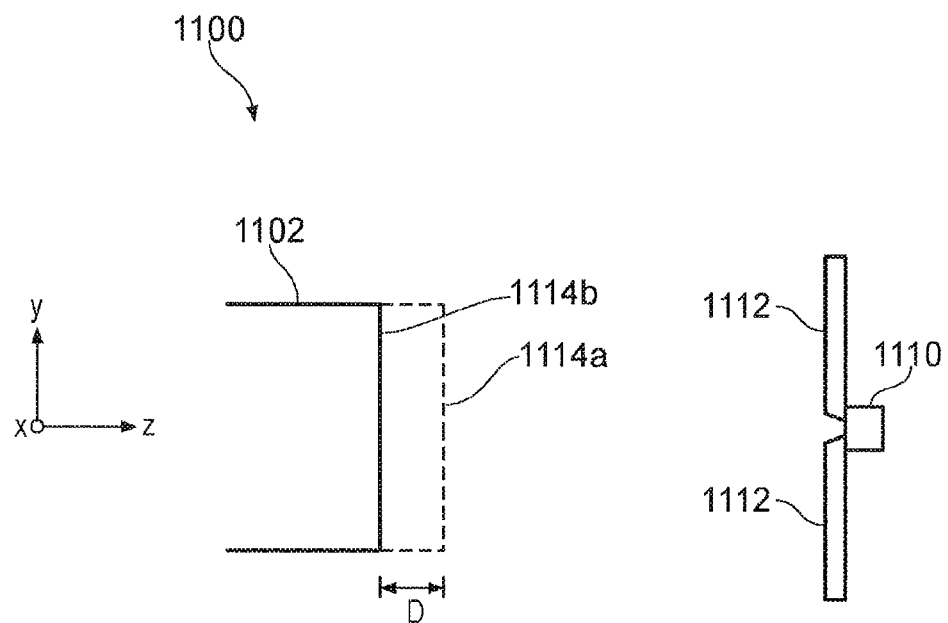
FIG. 11 is a diagram of a motion encoder according to a further embodiment of the invention.

Referring now to FIG. 11, a diagram of a motion encoder according to a further embodiment of the invention is shown generally at 1100. The motion encoder includes a first part 1102, with an outer reflective and partially transparent surface 1114a, an inner reflective and opaque surface 1114b, a first ICD 1110, and a pattern surface 1112. The joint (not shown) enables the first part 1102 to move only along its longitudinal axis, which is generally parallel to the Z axis. The movement has one DoF.

The outer reflective and partially transparent surface 1114a is axially offset and parallel to the inner reflective and opaque surface 1114b. The axial offset, or in other words the distance D between the plane of the outer reflective and partially transparent surface 1114a and the plane of the inner reflective surface 1114b is known to the processing unit.

Movement of the first part 1102 along the Z axis will result in the features of the pattern reflected by the reflective surface 1114a moving further apart from each other by a factor E1 as the first part 1102 moves closer to the ICD 1110.

Movement of the first part 1102 along the Z axis will result in the features of the pattern reflected by the reflective surface 1114b moving further apart from each other by a factor E2 as the first part 1102 moves closer to the ICD 1110.

The processing unit can determine the displacement of the first part 1102 along the Z axis based on a mathematical model that relates displacement of the joint along the Z axis to ratios E1 and E2 based on the equation $e=D\times(E1-1)\times(1-E2)/(E2-E1)$.

An advantage of the embodiments illustrated in FIGS. 9 to 11 is that they enable precise measurement of axial displacement with increased accuracy. Furthermore, when the ICDs are modelled as pinhole cameras, the embodiments of FIGS. 9 to 11 facilitate measurements in situations where the axial offset D is known or easier to measure than the distance of the pattern from the pinhole of an ICD.

Figure 12:
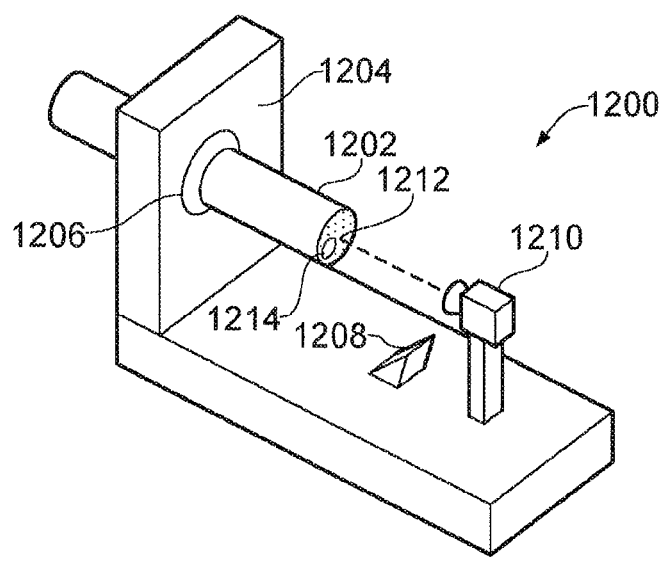
FIG. 12 is a diagram of a motion encoder according to a further embodiment of the invention.

Referring now to FIG. 12, a diagram of a motion encoder according to an embodiment of the invention is shown generally at 1200. Although the axes are not depicted, they may be defined as depicted in FIG. 2.

The motion encoder includes a first part 1202 that in this embodiment is a shaft, coupled through a bearing 1206 to a second part 1204, a first ICD 1210, a pattern surface 1212, a source of illumination 1208, and a processing unit (not shown). The bearing 1206 allows the first part to only move axially along the Z axis. The movement has one DoF.

The pattern surface 1212 is positioned on the first part 1202 of the joint, on the flat surface facing the ICD 1210.

The source of illumination in this embodiment is a light projector (not shown), positioned to be offset from the optical axis of the camera, that projects a pattern of features 1214 on the pattern surface 1212. The position and orientation of the projector with respect to the ICD 1210 and the joint is known to the processing unit.

The ICD 1210 is positioned on the second part 1204 of the joint, and arranged such that its optical axis is approximately parallel to the Z axis.

Movement of the first part 1202 along the Z axis will result in translation of the projected pattern 1214 across the pattern surface 1212 of the first part with a corresponding translation of features in the images captured by the ICD 1210.

The processing unit utilises knowledge of the position and orientation of the projector with respect to the ICD 1210 in order to relate the displacement of the first part 1202 along the Z axis to the motion of features of the pattern 1214.

Figure 13:
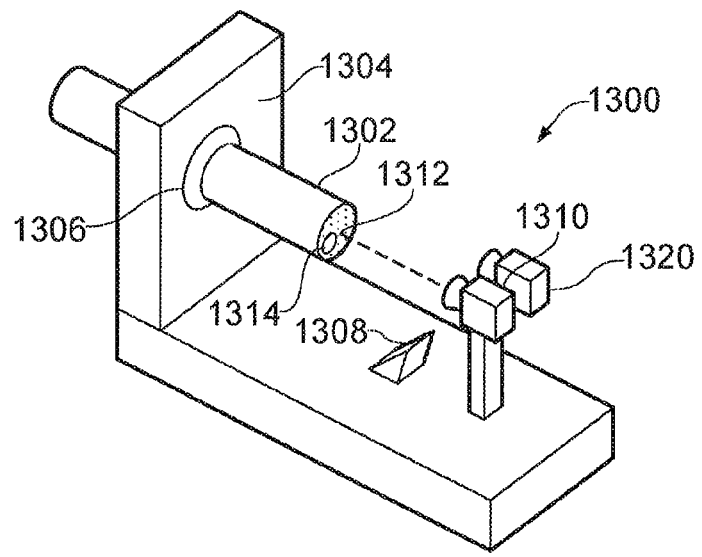
FIG. 13 is a diagram of a motion encoder according to a further embodiment of the invention.

Referring now to FIG. 13 a diagram of a motion encoder according to an embodiment of the invention is shown generally at 1300. The motion encoder includes a first part 1302 that in this embodiment is a shaft, coupled through a bearing 1306 to a second part 1304, a first ICD 1310, a second ICD 1320 a pattern surface 1312, a source of illumination 1308, and a processing unit (not shown). The bearing 1306 allows the first part to move with six DoF.

The pattern surface is positioned on the first part of the joint, on the flat surface and defines a set of pattern features. The pattern features define a pattern 1314.

The first ICD 1310 and the second ICD 1320 are positioned apart from each other whilst having overlapping views of the pattern 1314. The position and orientation of the second ICD 1320 with respect to the first ICD 1310 is constant and known.

Although in FIG. 13 the first ICD 1310 and the second ICD 1320 are arranged such that their optical axes are generally parallel, this does not need to be the case. Furthermore, although in FIG. 13 the first ICD 1310 and the second ICD 1320 are arranged in close proximity, they can in other embodiments be spaced apart from one another. Furthermore, the second ICD 1320 can be remote from the first part and/or the second part.

Motion of the first part 1302 in any of the six degrees of freedom will result in a corresponding motion of features in the images.

The processing unit in this embodiment employs a mathematical model that incorporates stereoscopic vision information supplied to the processing unit by the first ICD 1310 and the second ICD 1320 to derive the motion of pattern features along the X, Y and Z axes. Motion of the first part 1302 in any of the six DoF may be derived from the motion of three or more pattern features on the pattern surface 1312. Such mathematical models will be apparent to the skilled person given the benefit of the present disclosure and as such for brevity will not be described further.

In alternate embodiments, a projector may be used to project a pattern on the pattern surface to de-couple motion of the features from rotation of the first part around an axis (e.g. the Z axis). In this case it will not be possible to measure rotation about that axis.

Figure 14:
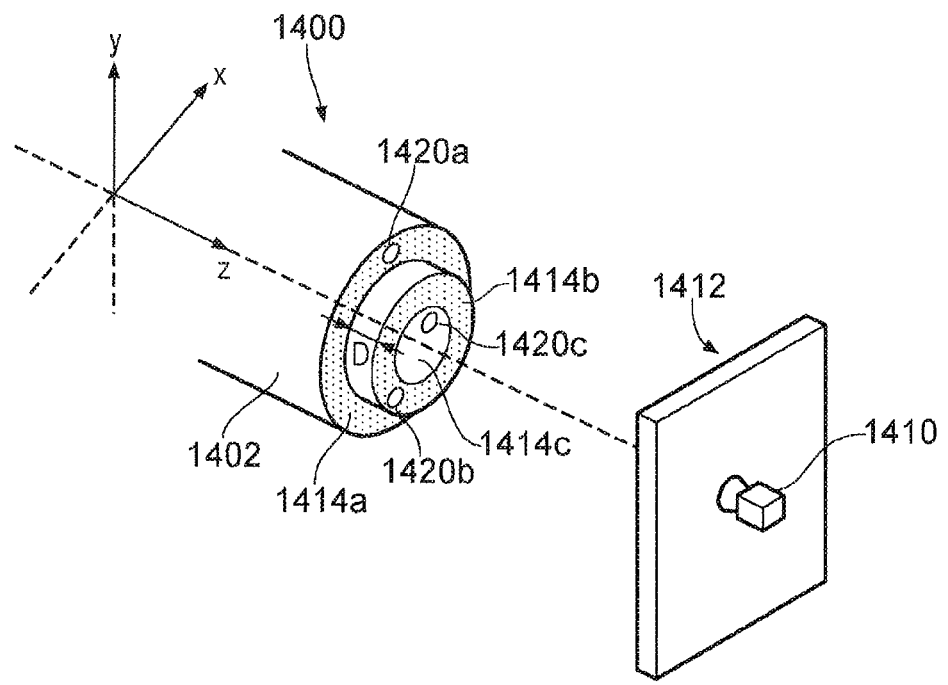
FIG. 14 is a diagram of a motion encoder according to a further embodiment of the invention.

Referring now to FIG. 14 a diagram of a motion encoder according to a further embodiment of the invention is shown generally at 1400. The motion encoder includes a first part 1402 that in this embodiment is a shaft, coupled through a bearing to a second part (not shown), a first ICD 1410, a pattern surface 1412, a source of illumination (not shown), and a processing unit (not shown). The bearing allows the first part to move with six DoF, primarily rotation about the Z axis with relatively small amounts of rotation about the X and Y axes and also translation along the X, Y and Z axes.

The axial face of the first part 1402 facing the first ICD 1410 comprises of three surfaces: an outer annular surface 1414*a*, an inner annular surface 1414*b* and an inner circular surface 1414*c*. The inner surfaces 1414*b* and 1414*c* are located on the same plane, and axially offset from the plane of the surface 1414*a*. The axial offset D of the plane of the surface 1414*a* and of the plane of the surfaces 1414*b* and 1414*c* is known to the processing unit.

The outer annular surface 1414*a* comprises surface features that comprise pattern A 1420*a*. The inner annular surface 1414*b* comprises surface features that comprise pattern B 1420*b*. The inner circular surface 1414*c* reflects surface features of pattern surface 1412 towards the ICD 1410 that comprise pattern C 1420*c*.

The ICD 1410 is positioned in the far side of the pattern surface 1412 relative to the first part 1402 with its optical axis generally aligned with the longitudinal axis of the first part 1402. The ICD 1410 is configured to image the surfaces 1414*a*-1414*c* through an aperture (not shown) of the pattern surface 1412.

The processing unit measures the transformation of patterns A, B and C and determines the movement of the first part in all six DoFs. Rotation about the Z axis (including determining Centres of Rotation) is derived from the motion of features associated with pattern A or B. Based on determined Centres of Rotation and the distance D the processing unit determines the orientation of the axis of rotation.

Rotation about the X or Y axis is derived from the motion of pattern C. As the first part 1402 rotates about the X or the Y axis, this results in a generally linear movement of the reflected pattern C as depicted in FIG. 5B.

Motion along the X or Y axis may be derived from the motion of features associated with pattern A or B. Movement of the first part 1402 along the X axis will result in the pattern A or B moving horizontally in the images captured by the ICD 1410 while movement of the first part 1402 along the Y axis will result in the pattern A or B moving vertically in the images captured by the ICD 1410, as depicted in FIG. 7B.

Motion along the Z axis may be derived from the motion of features associated with Pattern A, B or C. Movement of the first part 1402 along the Z axis will result in the features of the pattern A, B or C moving further apart from each other as the first part 1402 moves closer to the ICD 1410 or closer together as the first part 1402 moves away from the ICD 1410, as depicted in FIG. 8B.

In any embodiment, the surface features that physically define or form a pattern can comprise any combination of morphological characteristics of the surface, various colours, geometric patterns, and textures. The set of the features comprising the pattern may change to include different features, chosen with the help of human input or in an automatic way by the processing unit prior to or during the movement of the first part.

In any embodiment, characterising the transformation of the imaged features can include characterising motion, position, orientation, rotation or change of size of the imaged features. For example, motion may be characterised by displacement and rotation parameters and also deformation parameters (such as stretch or skew). Ascertaining such parameters may be achieved via methods which would be known to someone skilled in fields such as image processing or computer vision. One such method is commonly referred to in these fields as either optical flow estimation or motion estimation. A well-known direct method to estimate position/motion in a digital image is pattern matching (e.g. using a correlation function) while a well-known indirect method is the Kanade-Lucas-Tomasi (KLT) feature tracker.

In any embodiment, the processing unit can define a first coordinate system based on the range of motion of the first part relative to the ICD. The processing unit can transform the measure position and/or motion of the first part into another coordinate system. Fiducial markers can be used to define that coordinate system. The processing unit measures the position in the image of the features associated with the fiducial marker in order to infer the position of the origin of the coordinate frame.

A further operation that can be performed by the processing unit is to infer the position and/or motion of the first part of the joint relative to the second part from the position and/or motion of the features in the images. A first step is to derive the motion of the first part of the joint relative to the ICD. This may be achieved via techniques which would be known to someone skilled in fields such as computer vision or photogrammetry, e.g. camera models (such as the pinhole model), stereo vision, bundle adjustment, structured light techniques etc.

The ICDs employed in embodiments of the invention comprise a number of light sensing elements and can generate an image or sequence of images. An ICD can for example comprise a digital camera device, with the above functionality, e.g. a camera comprising a CMOS or CCD image sensor such as an industrial vision camera.

In any embodiment, the ICD can be configured to image a surface such that features of the surface are translated to features of an image. In the above embodiments the ICD is arranged so that its Field of View (FoV) includes the pattern of features in both the first and the second pattern positions.

In any embodiment, the processing unit can use template matching techniques coupled with a motion model to measure the position and motion of features in the images received from the ICD.

In any embodiment the processing unit can comprise one or more processors, one or more non-transitory computer readable medium such as read-only memory or random-access memory that can store data which can thereafter be read by the processing unit computer system, interfaces to communicatively couple the computer readable medium with the one or more processors and the ICD and a user input device that allows a user to interact with the processing unit.

In any embodiment, fiducial markers can be provided on parts of the joint or other parts within the FoV of an ICD to define certain features that are required to be part of the pattern or to define the location of measurement points.

In embodiments where the motion encoder measures rotational movement the processing unit can use a mathematical model of the circular motion of the pattern features and the circular or elliptical projection of that motion onto the image plane of the ICD (e.g. through a lens distortion model and pinhole camera model).

In embodiments where the motion encoder measures axial movement and it is necessary to reduce cross-talk effects due to rotational movement, the pattern can be designed to have circular symmetry (e.g. one or more concentric rings) such that the motion of features in the image is independent of rotation of the first part about a rotational axis.

In embodiments where a motion encoder measures rotational or lateral movement and it is desirable to reduce cross-talk effects due to axial movement along the optical axis of the ICD, one or more telecentric lenses can be positioned such that the ICD has an orthographic view of the pattern at the first pattern position and the second pattern position.

In any embodiment, due to imperfection of an ICD lens, some distortion may affect the general linear displacement of pattern features. However this can be corrected with a variety of computational or optical means.

In any embodiment, although movement is to be constrained to a specified number of DoF, some movement may be possible in other DoF due to bearing compliance. Such movement can be anticipated and quantified by the motion encoder, and its effect removed from the determination of the joint movement.

The skilled person will appreciate that further variations of the invention may comprise patterns that are observable by the ICD through a variety of reflective surfaces; patterns that extend to both the first and the second part of the joint; one or more ICDs that are independent of both the first part and the second part of the joint but are arranged to observe both parts of the joint such that the processing unit can employ any of the above mentioned techniques to infer the movement of the first part relative to the ICD and the second part relative to the ICD and thus determine the movement of the first part relative to the second part; or multiple ICDs configured to observe the same pattern such that stereoscopic vision information is supplied to the processing unit.

If the range of motion of the first part is sufficient to cause features that comprise a pattern in the image to move beyond the field of view of the ICD, measurement of the position/motion of features that are leaving the field of view may be handed over to alternate features that are still within the field of view. In such cases, a calibration process may be performed in order to produce a correction map which may be used to compensate for errors that may accumulate due to handing over features multiple time.

Robustness of the device to changes in the appearance of the pattern, e.g. due to dust or dirt on the pattern, may be improved by utilising the position/motion of multiple features and then ignoring any features that exhibit position/motion that is not consistent with the position/motion of the joint inferred by the remaining features.

In any embodiment, the encoder may additionally comprise an automatic exposure system (e.g. to vary the camera exposure time, gain, lens aperture, light intensity, etc.) in order to help ensure that images contain clear features associated with the pattern.

The optical components can be designed to operate within any suitable part of the electromagnetic spectrum; said part of the spectrum may not include the visible part of the spectrum.

The optical elements of the device can additionally comprise a filter, e.g. to reduce impact of ambient light by filtering wavelengths such that predominantly those emitted by the light source will enter the camera.

It should be noted that the above-mentioned embodiments illustrate rather than limit the invention, and that those skilled in the art will be capable of designing many alternative embodiments without departing from the scope of the invention as defined by the appended claims.

What is claimed is:

1. A motion encoder comprising:
   a joint, the joint comprising:
      a first part; and
      a second part, the first part being movably mounted with respect to the second part to change the joint between a first joint condition and a second joint condition;
   a first image capture device (ICD) comprising an array of light sensing elements arranged to generate images;
   a processing unit; and
   a pattern surface, the pattern surface defining or being arranged to define a pattern which moves relative to the first ICD between a first pattern position and a second pattern position as the joint changes between the first joint condition and a second joint condition, the pattern comprising pattern features,
   wherein:
      the first ICD has a field of view encompassing the first pattern position and the second pattern position such that the pattern features are visible to the first ICD in both the first pattern position and the second pattern position;
      the processing unit is communicatively coupled to the first ICD to receive the images from the first ICD, the processing unit being configured to determine how image features corresponding to the pattern features transform between the received images to quantify the position and/or movement of the first part relative to the first ICD; and
      the pattern surface comprises a reflective surface arranged to reflect the pattern features, the pattern features being defined by a remote object with respect to the pattern surface.

2. A motion encoder according to claim 1, further comprising an auxiliary pattern surface defining or being arranged to define an auxiliary pattern, the auxiliary pattern comprising auxiliary pattern features.

3. A motion encoder according to claim 1, wherein the pattern surface physically defines the pattern features.

4. A motion encoder according to claim 3, wherein the processing unit is configured to determine how image features corresponding to the pattern features transform between the received images by determining displacement of the image features between the received images to quantify movement of the first part relative to the first ICD.

5. A motion encoder according to claim 3, further comprising an auxiliary pattern surface defining or being arranged to define an auxiliary pattern, the auxiliary pattern comprising auxiliary pattern features wherein the auxiliary pattern surface physically defines the auxiliary pattern features and the auxiliary pattern surface is arranged in a spatially fixed, axially offset and parallel relationship with respect to the pattern surface and the processing unit is configured to determine a first datum point for the pattern in an image and determine a corresponding second datum point for the auxiliary pattern in the image and establish an orientation of an axis for the linking the pattern surface and the auxiliary pattern surface.

6. A motion encoder according to claim 3, wherein the processing unit is configured to determine how image features corresponding to the pattern features transform between the received images by determining linear displacement of the image features between the received images along two orthogonal axis within the images to quantify lateral movement of the first part relative to the first ICD along a pair of axes which are orthogonal to the central axis of the first part.

7. A motion encoder according to claim 6, wherein the pattern features are circularly symmetrical.

8. A motion encoder according to claim 1, wherein the pattern features are defined by being projected onto the reflective surface by a first light source and optionally the auxiliary pattern features are defined by being projected onto the auxiliary reflective surface by a second light source.

9. A motion encoder according to claim 8, wherein the first light source is arranged to project the pattern features along a fixed projection axis the orientation of which is known and offset and/or non-parallel with respect to the optical axis of the first ICD, the processing unit being configured to determine how image features corresponding to the pattern features transform between the received images by determining linear displacement of the image along an axis to quantify axial movement of the first part relative to the first ICD along the central axis of the first part.

10. A motion encoder according to claim 8, comprising a collimating lens arranged so that the pattern features and the first ICD are at the focal point of collimating lens.

11. A motion encoder according to claim 8, comprising a beam splitter arranged to receive light from the light source and direct it towards the reflective surface and permit an image of the features to pass through the beam splitter to be observed by the first ICD.

12. A motion encoder according to claim 8, wherein the processing unit is configured to determine how image features corresponding to the pattern features transform between the received images by determining displacement of the image features between the received images to quantify rotational movement of the first part relative to the first ICD about orthogonal lateral axes of the first part.

13. A motion encoder according to claim 1, further comprising one or more first fiducial markers located in a known spatial relationship with respect to a joint coordinate system and wherein the processing unit is configured to determine how image features corresponding to the pattern features transform between the received images to quantify the position and/or movement of the first part relative to the joint coordinate system.

14. A motion encoder according to claim 1, further comprising one or more second fiducial markers arranged to define at least some of the pattern features.

15. A motion encoder according to claim 1, further comprising one or more further sensors arranged to measure movement of the first part relative to the second part, wherein the processing unit is configured to quantify the position and/or movement of the first part relative to the first ICD based on how image features transform between the received images and the outputs of the one or more further sensors.

16. A motion encoder according to claim 1, wherein the first ICD is mounted in a known spatial relationship with respect to the second part and the processing unit is configured to quantify the movement of the first part relative to the second part based on the quantified movement of the first part relative to the ICD and the known spatial relationship between the second part and the ICD.

17. A motion encoder according to claim 1, wherein the first ICD is arranged to view the pattern surface and optionally the auxiliary pattern surface through a hole in the remote object.

18. A motion encoder according to claim 1, wherein pattern features comprise a first subset and a second subset different than the first subset and the processing unit is configured to determine how image features corresponding to the pattern features transform between the received images by determining a change in the distance between the first subset and the second subset to quantify axial movement of the first part relative to the first ICD along the central axis of the first part.

19. A motion encoder according to claim 1, further comprising a second ICD mounted in a known spatial relationship with respect to the first ICD, a second ICD comprising an array of light sensing elements arranged to generate images, the second ICD having a second field of view encompassing the first pattern position and the second pattern position such that the pattern features are visible to the second ICD in both the first pattern position and the second pattern position, the processing unit being coupled to the first ICD and the second ICD and being configured to determine how image features corresponding to the pattern features transform between the received images from both ICDs to quantify the position and/or movement of the first part relative to the first ICD.

20. A motion encoder according to claim 1, wherein the second part is movably mounted with respect to the first part to change the joint to a third joint condition and the pattern moves relative to the first ICD to a third pattern position as the joint changes between the first and/or second joint condition and the third joint condition, the third pattern position being at least partially outside the field of view of the first ICD, wherein the processing unit is configured to:
  determine that the pattern is moving to the third pattern position;
  select new image features having a known spatial relationship with respect to the image pattern features to replace the image pattern features; and
  determine how the new image features transform between the received images to quantify the position and/or movement of the first part relative to the first ICD.

21. A motion encoder according to claim 2, wherein the pattern surface comprises a reflective surface arranged to reflect the pattern features, the pattern features being defined by a remote object with respect to the pattern surface and the auxiliary pattern surface comprises an auxiliary reflective surface arranged to reflect the auxiliary pattern features, the auxiliary pattern features being defined by a remote object with respect to the auxiliary pattern surface, wherein either the auxiliary pattern surface is arranged in a spatially fixed, axially offset and parallel relationship with respect to the pattern surface or the auxiliary reflective surface is arranged in a spatially fixed, axially offset and parallel relationship with respect to the reflective surface.

22. A motion encoder comprising:
  a joint, the joint comprising:
    a first part; and
    a second part, the first part being movably mounted with respect to the second part to change the joint between a first joint condition and a second joint condition;
  a first image capture device (ICD) comprising an array of light sensing elements arranged to generate images;
  a processing unit; and
  a pattern surface, the pattern surface defining or being arranged to define a pattern which moves relative to the first ICD between a first pattern position and a second pattern position as the joint changes between the first joint condition and a second joint condition, the pattern comprising pattern features,
  wherein:
    the first ICD has a field of view encompassing the first pattern position and the second pattern position such that the pattern features are visible to the first ICD in both the first pattern position and the second pattern position;
    the processing unit is communicatively coupled to the first ICD to receive the images from the first ICD, the processing unit being configured to determine how image features corresponding to the pattern features transform between the received images to quantify the position and/or movement of the first part relative to the first ICD; and the processing unit is configured to select image features to define the pattern features and to determine how the image features transform between the received images to quantify the position and/or movement of the first part relative to the first ICD.

23. A subassembly for a motion encoder, the subassembly comprising:
a first image capture device (ICD) comprising an array of light sensing elements arranged to generate images; and
a processing unit, the processing unit is communicatively coupled to the first ICD to receive the images from the first ICD, the processing unit being configured to select a plurality of image features to define a plurality of pattern features and to determine how the plurality of image features transform between the received images to quantify the position and/or movement of a pattern relative to the first ICD, the pattern comprising the plurality of pattern features.

24. A motion encoder comprising:
a joint, the joint comprising:
   a first part; and
   a second part, the first part being movably mounted with respect to the second part to change the joint between a first joint condition and a second joint condition;
a first image capture device (ICD) comprising an array of light sensing elements arranged to generate images;
a processing unit; and
a pattern surface, the pattern surface defining or being arranged to define a pattern which moves relative to the first ICD between a first pattern position and a second pattern position as the joint changes between the first joint condition and a second joint condition, the pattern comprising pattern features, wherein:
   the first ICD has a field of view encompassing the first pattern position and the second pattern position such that the pattern features are visible to the first ICD in both the first pattern position and the second pattern position;
   wherein the second part is movably mounted with respect to the first part to change the joint to a third joint condition and the pattern moves relative to the first ICD to a third pattern position as the joint changes between the first and/or second joint condition and the third joint condition, the third pattern position being at least partially outside the field of view of the first ICD, wherein the processing unit is configured to:
      determine that the pattern is moving to the third pattern position;
      select new image features having a known spatial relationship with respect to the image pattern features to replace the image pattern features; and
      determine how the new image features transform between the received images to quantify the position and/or movement of the first part relative to the first ICD; and
   the processing unit is communicatively coupled to the first ICD to receive the images from the first ICD, the processing unit being configured to determine how image features corresponding to the pattern features transform between the received images to quantify the position and/or movement of the first part relative to the first ICD.

* * * * *